United States Patent

[11] 3,588,064

| [72] | Inventor | Piero Montanari |
| | | Via Monte Oliveto, Rome, Italy |
| [21] | Appl. No. | 754,518 |
| [22] | Filed | July 10, 1968 |
| [45] | Patented | June 28, 1971 |
| [32] | Priority | July 11, 1967 |
| [33] | | Italy |
| [31] | | Pat. 791672 |

[54] HYDROPNEUMATIC SHOCK ABSORBER PROVIDED WITH ELASTIC BELLOWS SEPARATOR OF WORKING FLUIDS
4 Claims, 10 Drawing Figs.

| [52] | U.S. Cl. | 267/64 |
| [51] | Int. Cl. | F16f 9/02 |
| [50] | Field of Search | 267/64, 35 |

[56] References Cited
UNITED STATES PATENTS
3,361,422  1/1968  Theuleau............ 267/64

*Primary Examiner*—James B. Marbert
*Attorney*—Peter M. Boesen

ABSTRACT: A telescopic-type hydropneumatic shock absorber having a gas containing elastic bellows member which comprises a cylinder piston unit, a movable piston disposed therein having both round compression and extension leaf springs, holes therein covered by the elastic action of said leaf springs and elastic bellows separating two fluids therein used for the shock-absorbing action, wherein the elastic bellows member has distributed on its cone rings the stress originated by the piston stroke in the cylinder.

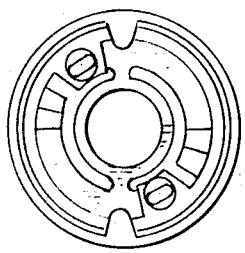
FIG.2A
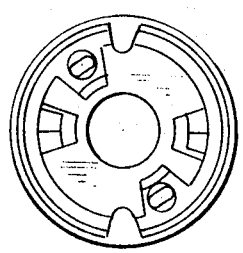
FIG.2F
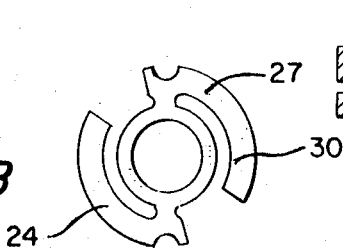
FIG.2B
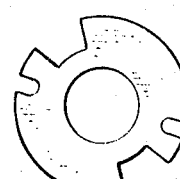
FIG.2G
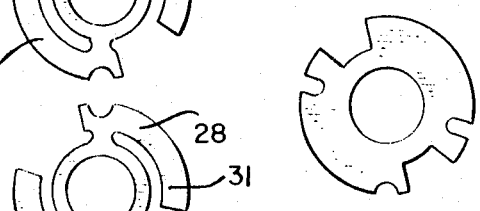
FIG.2C
FIG.2H
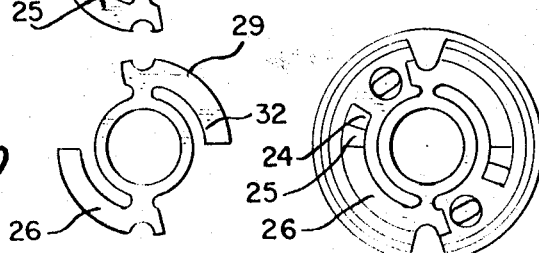
FIG.2D
FIG.2L
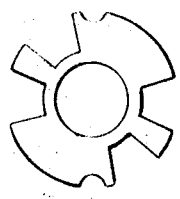
FIG.2E
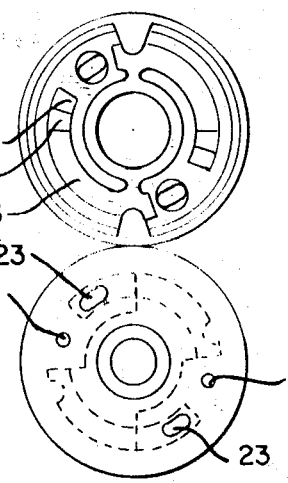
INVENTOR.
PIERO MONTANARO
BY Peter M Boesen
ATTORNEYS

HYDROPNEUMATIC SHOCK ABSORBER PROVIDED WITH ELASTIC BELLOWS SEPARATOR OF WORKING FLUIDS

The present invention relates to a telescopic-type hydropneumatic shock absorber including a bellows container for a gaseous fluid, suitable to meet all requirements for its practical appliances.

Hydraulic shock absorbers of the conventional double chambered telescopic type, often present disadvantages which could not be easily and satisfactorily eliminated up to now.

Such disadvantages are mostly due to the need to reduce to a minimum size the shock absorber inner barrel, so that its piston diameter must be very small and the specific working pressure very high.

Such high specific pressures and the repeated alternate movement of the main member produce high working temperatures; moreover free cooling of the cylinder chamber is made more difficult by the outer casing and the necessarily small cavity, in view of the above-mentioned minimum size of the shock absorber.

It is obvious that the viscosity of the oil usually employed in this device shows traces of such disadvantages and consequently affects the shock absorber regular work.

To said drawbacks we shall add those deriving from the presence of a two-way valve (foot valve) to check the oil flow to and from the recovery chamber these are necessary portions of said shock absorber type, but they provide a hindrance which never allows an immediate balance of volumes displaced by the piston alternate strokes.

For this reason too, telescopic type conventional shock absorbers cannot avoid to produce capacity voids, which may be felt or not in the vehicle running, but which affect the road holding, the braking distance, the tires wear and the vehicle comfort as a whole.

Said disadvantages partly disappear and are partly reduced in single chamber shock absorbers provided with foot valve (Telaflow, Allinquant) or oleopneumatic (De Carbon); in the latter type a movable diaphragm separating oil and compressed gas ensures an immediate balance of fluids. Besides oil pressurization wholly prevents emulsions. Even said solution has its weak point, i.e., the use of a movable diaphragm separating oil and gas, consisting of a metal plate with a special rubber sealing ring.

More or less remarkable wear produces a leakage of gas into the hydraulic chamber and of oil into the pneumatic chamber. Said even small leakage is sufficient to produce emulsifying which, together with the loss of pressure in the pneumatic chamber, prevents the shock absorber regular working.

The main object of the present invention is to provide as separating member between liquid and gas, special rubber bellows resistent to high working temperatures and to the contact with oil employed in the shock absorber.

By said bellows system I obtain an elastic chamber whose strains, following to the piston stroke, are distributed on a great number of cone rings, so that the stress on each cone ring is considerably reduced, thus reducing also the corresponding deformation. By this system no small areas are submitted to great stresses as it happens by cone diaphragms envisaged to the same end.

The second object of the present invention is to utilize for the main member of the shock absorber, a steel barrel suitably closed at both ends and namely with no welded or screwed portions. Closure caps provided with a peripheral cone groove, seat of an expansion ring whose peripheral outer surface is located in a corresponding circular groove on the inner cylinder wall, are envisaged to ensure a satisfactory sealing of cylinder ends. By this system it is possible to avoid disassembly of caps after release of the ring in its seat.

These and other characteristics of the shock absorber relating to the present invention will be most evidenced in the description of a preferred embodiment, which meets all practical requirements and avoids said disadvantages of conventional shock absorbers. Obviously I think it possible to modify the embodiment described and illustrated hereunder, in order to fit it to all practical requirements, just by keeping unchanged its main principles, object of the present invention.

FIGS. 2A to 2L illustrate the main portions of the inner cylinder of the shock absorber.

Figure 1:
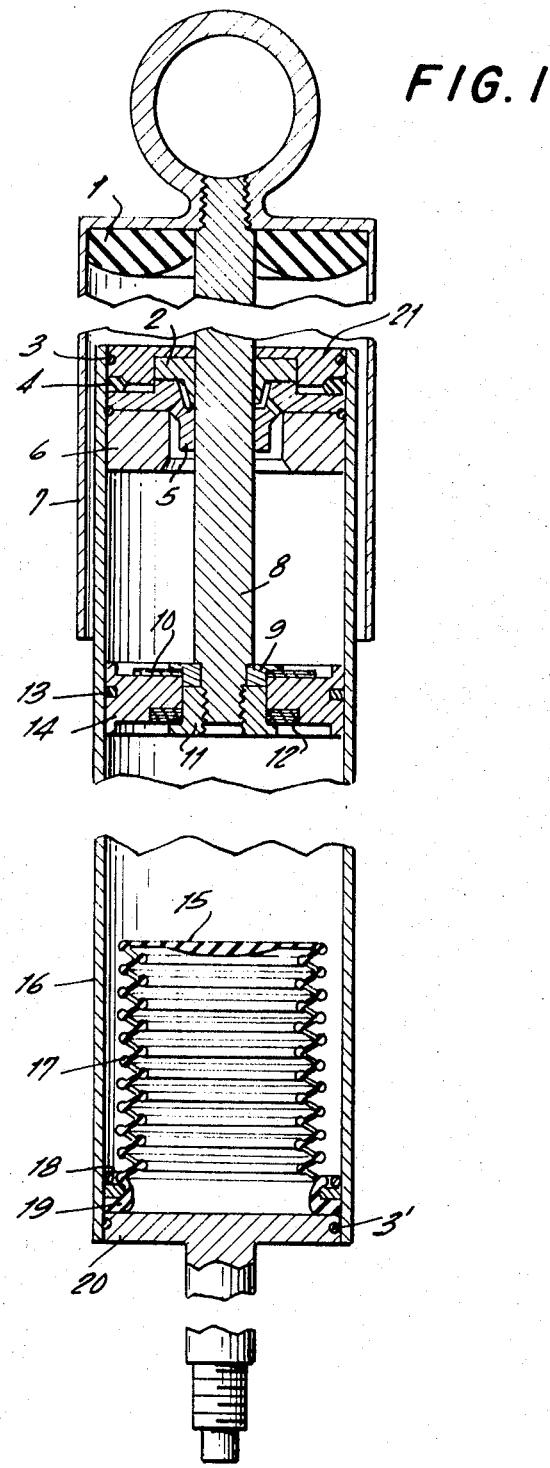
FIG. 1 is a longitudinal, diametral section of the shock absorber embodying the invention, by way of example only.

Referring to FIG. 1 the shock absorber includes a cylinder 16 whose upper and lower ends may be closed by upper and lower closure caps 21 and 20 respectively. According to the same FIG., such caps provide a perfect closure by means of split rings 3, 3' located in suitable peripheral conical grooves of caps 21 and 20 respectively, and in the corresponding circular grooves inside of the cylinder.

The piston includes a main ring-shaped member 14 with a broad contact band with the inner cylinder wall. Said band is provided with a suitable perimetral groove, seat of the piston ring 13. The piston rod 8 can be locked to said ring-shaped member 14, by means of intermediate portions 9, 10 and 11, 12. The smaller diameter of the rod lower end, in its cylindrical portion, provides a seat to disc which operates as upper pressure disc and leans on the abutment provided by said small diameter of the rod lower end. Said abutment shaped upper pressure disc 9 provides a seat to the round compression leaf spring 10, whose thickness, together with the thickness of said abutment of the pressure disc 9, substantially correspond to the upper recess of the ring-shaped piston member 14. A stop nut 11 envisaged on the threaded end of the rod locks the unit piston leaf springs.

By this I obtain a piston unit suitable to stand strains thanks to the round leaf springs 10 and 12, of compression and extension respectively. The ring shaped piston member 14 usually includes a sintered steel disc with a hole in the middle for adjusting said complementary portions connecting with the rod. In diametrically opposed positions of the disc two couples of holes for oil passage are envisaged and namely the compression and extension passage holes. One of those two couples, the compression one, is shown on FIG. 2G.

The higher perimetric portion provides a greater security to the piston guide, with consequently low specific pressures in the piston slide in the cylinder; this brings about reduced wear, constant sealing, low heating, very slight expansions, impossibility of seizure and regular working conditions for the oil.

Referring to control of oil flow in the compression and extension strokes, further explanations will follow.

The following members contribute to the guide of rod 8: head member a member 5 with a hole in the middle for the rod sliding and an oil retainer 2, centrally adjusted in a suitable notch on the upper closure cap 21. The O-ring 4 operates as a stop ring in this part of the cylinder, whereas in the cylinder barrel 16 is adjusted an extension buffer 6. The exterior cover 7 fits over cylinder 16. The assembly closing the cylinder takes thus a functional feature which makes it suitable to meet all practical requirements of the shock absorber. It is evident that the most important part for a dampening effect are the piston itself and its elastic bellows chamber. The bellows chamber 17 consists of cone discs and allows a strong total deformation distributed on a great number of cone rings, so that deformation stresses on them are quite limited. This system guarantees a long life of the unit because there are no small or large areas submitted to a considerable elastic stress, as it occurs, for instance, to bell diaphragms, where the deformation provokes the complete diaphragm overturning along a circular section.

The bellows end plate 15 turned to the piston, is a round, close portion, practically smooth as concerns the outer surface, whose thickness gradually increases to the middle, so as to stand stresses during the work of the shock absorber. The bellows opposite end is constituted by a conic-cylindrical bellow base ring 19, whose diameter is larger than that of the inner cylinder barrel 16, so that it forces against the cylinder inner wall, bearing on a ledge ring 18. Said shape envisaged in this embodiment, facilitates the inlet of oil from the opposite end of the cylinder barrel after assembling of the bellows chamber, and without any possibility of leakage to the interior of the bellows.

As aforementioned, said cylinder 16 is closed by a cap 20 with said split piston ring 3', as evidenced by FIG. 1. After both assembling of said bellows 17 and inlet of oil from the opposite cylinder end, it is possible to lock said closure cap 20, under pressure for final bedding, under a strong pressure of the conic-cylindrical bellows base ring 19 against the corresponding cylinder inner wall, by utilizing even the ledge ring 18.

I assure thus the sealing of both fluids working in the shock absorber and the locking of the lower closure cap 20. The locking of the lower closure cap 20 provides also a sealing of absolute safety to the gas let in just before forcing the cap 20 into its seat.

Inlet of gas is obtained through a device, which in its rudimentary embodiment consists of a cylinder placed following to the shock absorber cylinder, with a side hole corresponding to the contact point of the bases, through which gas is let in at an established pressure.

The use of bellows 17 as a container of the gaseous fluid employed in this shock absorber, preferably azote, helps a better stretching of the shock absorber, than the one obtained by conventional shock absorbers.

Concerning the control of oil flow in the compression and extension stroke, I shall add that in my embodiment I obtain it by means of a system of curved plates springs, superposed so as to provide on each face a couple of round leaf springs covering by their free end the corresponding oil outlet holes.

Referring to FIGS. 2A through 2H and 2L of the drawing and with reference to numerals 24 through 32, it must be pointed out that the leaf springs are indicated with reference numerals 24 through 27 respectively. One of the most important features of these leaf spring derives from the fact that when single leaf springs are superimposed upon one another, units containing three components are found wherein the single springs have a decreasing length. As shown in plan view FIG. 2L, leaf 24 is the longest of the trio and 26 the shortest. This length control is in keeping with the estimated initial dumping load through units which are acting upon hole paris 22 and 23. These leaves have outer edges 27, 28 and 29 and inner edges 30, 31 and 32. The leaf springs perform their valve function directly without interposition of any other means. Because of the different arc length existing between the edges of the leaf springs of each unit, a torque may be provided during operation both in single arcuate leaf springs and units of the same as to absorb violent movements of the piston by lifting at the oil passage. The plates 24, 25 and 26 tilt, thus raising up their outer edges 27, 28 and 29 to moderate the stress conveyed.

In the portion between the end of a plate and the fixed end of the following one, are opened the oil inlet holes, holes which are covered, on the other piston side, by the free end of the corresponding couple of round leaf springs.

Each leaf spring consists of a main plate, see FIG. 2B, intended to cover the oil outlet hole, and of two secondary plates (FIGS. 2C and 2D); such plates have an arch width decreasing outwards and a growing thickness, so as to distribute the elastic deformation on the whole length of the free section of the round leaf spring.

The connection end of the round leaf spring is locked to the piston plate through a stiff member 2E which operates as both a thrust washer and a limiting device of the main plate deformation. Such limiting device is intended to prevent possible vibrations of the free end of the main plate, consequently to pulsations of flow.

However by the round leaf spring, as it occurs by a half-elliptic leaf spring, an efficient effect of reciprocated vibration damping is obtained. It follows that there exist no critical flow speeds.

Another important characteristic of said spring system of the shock absorber embodying the invention, is the easiness of gauging the shock absorber, by suitably modifying the arch length of the secondary plates FIGS. 2C and 2D).

Another interesting feature is the reaction of quick binding to the piston violent movements. This is due to the arch-shaped plates; by lifting at the oil passage, the plates tilt thus raising up their outer edge (obviously being greater the length and so the possible deformation of the plate outer arch vis-a-vis the inner one).

If the speed of oil flow considerably increases, the further possible deformation of plates establishes a torsional stress which gets the free end of the main plate, FIG. 2B, parallel to the piston face.

The reaction of a torsionally stressed leaf spring is greater than that of a binding stressed one, so that the round leaf spring operates as a double way system, but with the advantage of greater simplicity, a better progression and a constant load in the time.

A thin disc (FIG. 2H) with four notches on its circumference vis-a-vis the oil holes, allows the free circulation of a small oil quantity under the main plate (FIG. 2B); it is a very small passage which varies according to the disc thickness. The gauging of said idling jet is made by suitably choosing the disc thickness; by this system, with no separated idling holes, obstructions of the passage due to whichever cause are excluded.

FIG. 2L, a coplanar middle section of the piston, with sliding of the two halves for a diameter length, illustrates the position of the round leaf springs; namely the upper section shows the piston lower face, the lower section shows the opposite face appearing through.

For a better understanding of the shock absorber described and illustrated, by way of example only, I can add that the piston has on each face, in correspondence with the skirt inner wall, two cylindrical projections in a diametrically opposite position; around them are engaged the semicircular notches of discs springs and compression stiff members.

I mentioned at the beginning the difficulties of free cooling due to a dust cover (casing). Considering that the temperature of this new shock absorber type according to the invention do not reach high values because of the characteristic bellows container of gaseous fluid and the reduced stress of moving members, the above-mentioned difficulties of cooling have no particular importance.

As concerns the dust cover (FIG. 1), I remark that n. 7 has the inner bottom provided with compression buffers 1 fitted to meet all requirements.

I claim:

1. A telescopic type hydropneumatic shock absorber, which comprises a cylinder piston unit, the movable piston disposed therein having both round compression and extension leaf springs, and through holes therein covered by the elastic action of said leaf springs, and elastic bellows separating the two fluids used for the shock absorbing action, wherein the elastic bellows member makes it possible to distribute on its cone rings the stress originated by the piston stroke in the cylinder.

2. A shock absorber according to claim 1, wherein the cylinder includes a steel barrel whose ends may be closed by means of closure caps adjusted and kept in position by piston rings and whose sealing is guaranteed by suitable sealing rings; the sealing ring corresponding to the end where said elastic bellows member is assembled being constituted by the end portion of said bellows member shaped as a cylindrical-conic ring.

3. A shock absorber according to claim 2, wherein said force-fit cylindrical-conic ring of the bellows member separating the two working fluids and the sealing adjustment of the cap in the corresponding cylinder end, make it possible to maintain inside said separating bellows member a pressure fluid necessary to the shock absorbing effect.

4. A shock absorber according to claim 2 wherein inlet of pressure fluid in the bellows is obtained through a device which avoids the need of an inlet valve on the bottom of said shock absorber.